J. SHELLY.
SAW-CLAMP.
No. 179,734. Patented July 11, 1876.
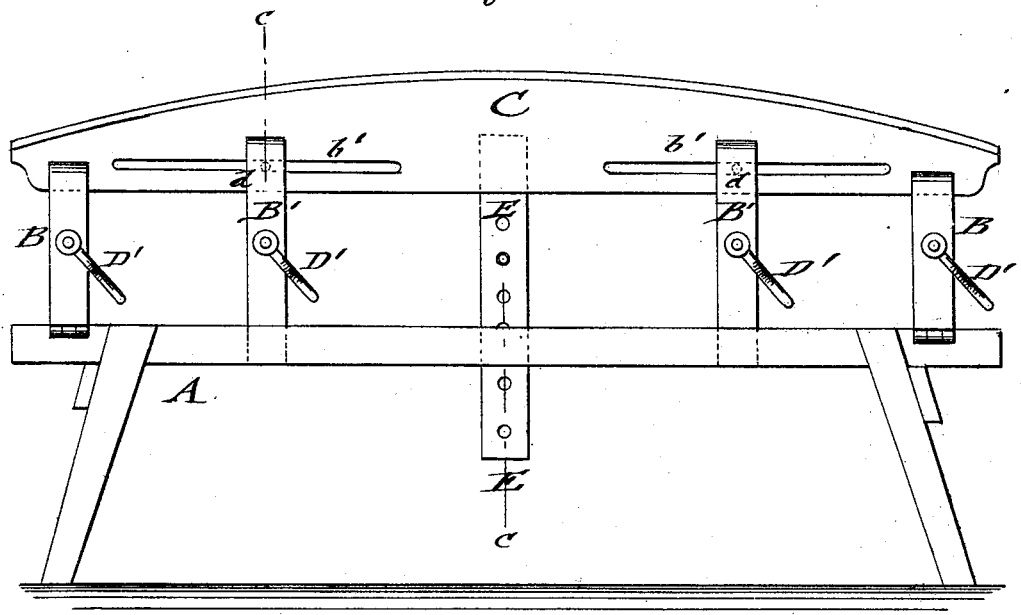
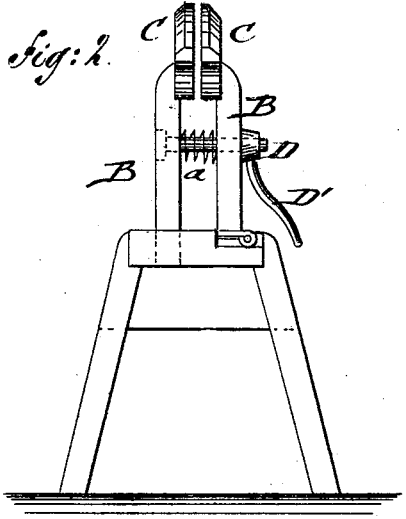
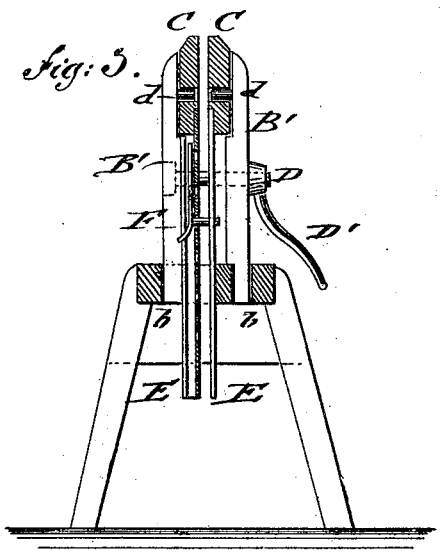
WITNESSES:
Chas. Nida.
John Goethals
INVENTOR:
J. Shelly
BY
ATTORNEYS.

UNITED STATES PATENT OFFICE.

JOSEPH SHELLY, OF MARIPOSA, CALIFORNIA.

IMPROVEMENT IN SAW-CLAMPS.

Specification forming part of Letters Patent No. 179,734, dated July 11, 1876; application filed March 21, 1876.

*To all whom it may concern:*

Be it known that I, JOSEPH SHELLY, of Mariposa, in the county of Mariposa and State of California, have invented a new and Improved Saw-Clamp, of which the following is a specification:

In the accompanying drawing, Figure 1 represents a side elevation of my improved saw-clamp; Fig. 2, an end view, and Fig. 3 a vertical transverse section of the same on the line $c\ c$, Fig. 1.

Similar letters of reference indicate corresponding parts.

My invention relates to an improved clamp for holding straight and circular saws of all sizes for filing, swaging, and setting the same; and the invention consists of clamping-jaws, that are adjusted by stationary and sliding clamp-pieces, screw-bolts, and nuts, to the saw, in connection with a central spring-pin, and grinding and locking bars for holding and turning circular saws in the clamp.

In the drawing, A represents a supporting-frame, which is placed on legs for carrying the jaw-holding pieces B at suitable height. One of the jaws C is fastened to the stationary outer clamp-pieces B, while the other jaw C is applied to hinged outer pieces B, which are acted upon by spiral or other springs $a$, to open readily the jaws when the clamping-nuts are unscrewed. The jaws C are made of such length that any saw, from a small key-hole saw up to a large crosscut-saw, or any size of circular saw, may be securely held by the same. Additional clamping-pieces B′ slide in guide-slots $b$ of frame A, and by pins or lugs $d$ in slots $b'$ of the jaws, to be moved toward or away from the center of the clamp, as required by the size and kind of saw to be clamped. The clamping-pieces B and B′ are connected by lateral bolts D and thumb or crank nuts D′, by which the jaws are quickly and tightly applied to the saw. The jaws C are provided at the center with vertical downward-extending bars E, that may be extended below frame A, one being flanged and perforated to guide a spring-pin, F, (shown in Fig. 3,) that extends across the space between the bars to that of the opposite jaw, and enters a corresponding hole of the same. The spring-pin F serves as center pivot for the circular saws to be held in the clamp, and is set into higher or lower position, according to the radius of the saws.

When the circular saw is placed by its center hole on the spring-pin F, it is clamped by the jaws for filing and setting the teeth. The jaws are then unclamped and the saw is merely turned on the center pin until a new set of teeth is above the jaws, when the same are closed again to admit work on the teeth, and so on until all the teeth are set. The saw-clamp is readily opened and closed, and applied to large and small saws of all kinds, so as to form a clamp of superior construction to the devices hitherto in use.

Having thus described my invention, I claim as new and desire to secure by Letters Patent—

The combination of the saw-clamping jaws, with downward-extending guide-bars, and an adjustable spring-pin locking into perforations of the bars for supporting and turning circular saws placed into the jaws, substantially as specified.

JOSEPH SHELLY.

Witnesses:
R. B. THOMAS,
JOSEPH JACKSON.